(12) United States Patent
Dharssi

(10) Patent No.: US 6,421,986 B1
(45) Date of Patent: Jul. 23, 2002

(54) METHOD OF ADVERTISING BY DISTRIBUTING TARGETED PROMOTIONAL MATERIALS INSIDE PACKAGES OF BREAD

(75) Inventor: Fatehali T. Dharssi, Vancouver (CA)

(73) Assignee: DSD Communications, Inc., Renton, WA (US)

( * ) Notice: Subject to any disclaimer, the term of this patent is extended or adjusted under 35 U.S.C. 154(b) by 0 days.

(21) Appl. No.: 09/689,540

(22) Filed: Oct. 12, 2000

(51) Int. Cl.[7] .............................................. B65B 61/20
(52) U.S. Cl. .......................................... 53/474; 53/415
(58) Field of Search .......................... 53/238, 411, 415, 53/474, 516

(56) References Cited

U.S. PATENT DOCUMENTS

| | | | |
|---|---|---|---|
| 1,308,321 A | | 7/1919 | Armstrong |
| 1,602,881 A | | 10/1926 | Christensen |
| 1,683,789 A | | 9/1928 | Molins |
| 1,721,552 A | | 7/1929 | Foernsler |
| 1,805,119 A | | 5/1931 | Voigt |
| 1,818,923 A | * | 8/1931 | Taylor .......................... 53/449 |
| 1,913,642 A | | 6/1933 | Smith |
| 2,072,516 A | | 3/1937 | Ferenci et al. |
| 2,227,378 A | | 12/1940 | Milmoe et al. |
| 2,741,889 A | | 4/1956 | Garapolo et al. |
| 2,821,826 A | | 2/1958 | Stubblefield |
| 3,952,478 A | | 4/1976 | Richards et al. |
| 4,182,222 A | * | 1/1980 | Stahl ............................. 93/35 |
| 4,268,344 A | * | 5/1981 | Jones ......................... 156/227 |
| 4,355,967 A | | 10/1982 | Hellmer |
| 4,530,200 A | | 7/1985 | Prewer |
| 4,658,564 A | | 4/1987 | Bell, Jr. et al. |
| 4,833,861 A | * | 5/1989 | Hale et al. ..................... 53/390 |
| 4,837,956 A | * | 6/1989 | Dolence ....................... 428/200 |
| 4,908,761 A | * | 3/1990 | Tai ................................ 705/14 |
| 5,002,313 A | * | 3/1991 | Salvatore .................... 283/102 |
| 5,079,901 A | | 1/1992 | Kotsiopoulos ................ 53/435 |
| 5,368,286 A | | 11/1994 | Horsman et al. |
| 5,481,094 A | * | 1/1996 | Suda ........................... 235/383 |
| 5,549,233 A | | 8/1996 | Clauser ........................ 225/100 |
| 5,680,743 A | * | 10/1997 | Hoekzema .................... 53/446 |
| 5,727,153 A | * | 3/1998 | Powell ........................ 235/383 |
| 5,806,044 A | * | 9/1998 | Powell ........................ 235/383 |
| 5,819,954 A | * | 10/1998 | Lacriola ...................... 198/349 |
| 5,826,356 A | * | 10/1998 | Lapp ............................. 229/74 |

FOREIGN PATENT DOCUMENTS

| | | |
|---|---|---|
| DE | 1761426 | 6/1971 |
| FR | 2332935 | 6/1977 |

\* cited by examiner

*Primary Examiner*—Scott A. Smith
*Assistant Examiner*—Nathaniel Chukwurah
(74) *Attorney, Agent, or Firm*—Pillsbury Winthrop LLP

(57) ABSTRACT

A method for distributing promotional material is disclosed. The method, which may be practiced as a fully-automated process, calls for the use of packages of bread as unique vehicles through which selected segments of the consumer population may be targeted for advertising and other promotional activity while, at the same time, providing retailers with the ability to plan, and stock for, national and/or local promotions. The invention achieves its objectives by generating packets that contain one or more items from a multiplicity of categories of promotional materials, wherein the specific items are selected as a function of the targeted segment of the consumer population, the type of bread that is to be packaged, and the retail chain store to which the packaged bread is to be delivered.

18 Claims, 2 Drawing Sheets

METHOD OF ADVERTISING BY DISTRIBUTING TARGETED PROMOTIONAL MATERIALS INSIDE PACKAGES OF BREAD

BACKGROUND OF THE INVENTION

1. Field of the Invention

This invention is in the field of marketing and promotional advertising and, more particularly, directed to a method for providing promotional material, such as coupons, advertisements, samples, food recipes, publications, informational sheets, and other promotional items, such as refrigerator-door magnets, inside packages of sliced bread, so as to directly target segments of consumers identified as primary demographic groups in an efficient and cost-effective manner.

2. Art Background

Product "couponing" dates back to the late 1890's, when C. W. Post developed penny tokens that were redeemable on his then new "Grape-Nuts" breakfast cereal. Realizing the effectiveness of couponing as a means to generate trial, as well as encourage repeat purchases, companies such as Coca Cola, Procter & Gamble, and Hershey quickly adopted this marketing innovation. Today, couponing is the dominant promotion marketing tool employed by consumer-driven companies to stimulate consumer behavior in multiple channels of distribution. Whereas, at one point in time, couponing was employed almost exclusively by the consumer package goods (CPG) industry, it is now utilized extensively by companies such as Blockbuster Video, Pizza Hut, and Lenscrafters.

Currently, the predominant methods of coupon delivery are Shared Mail, which delivers national and local coupons wrapped in a supermarket retailer's weekly flyer, direct mail and Sunday Free Standing Inserts (FSI), which are four color, multi-page inserts distributed through Sunday newspapers. Currently, couponing is dominated by FSIs, which were introduced in 1972. In 1999, FSIs accounted for 92% of the 288 billion coupons distributed, as well as 71% of all redemptions.

However, the shear number of coupons distributed provides only a partial indication of the level of success achieved by any couponing scheme; success also depends on the frequency with which the distributed coupons are actually redeemed by consumers. In this regard, while the FSI share of distribution has increased slightly since the mid-1990's, declining coupon redemption rates have led advertisers to explore alternative avenues to improve cost efficiency and effectiveness. As such, in the past several years, coupon distribution has declined as the search for more effective promotional schemes has prompted marketers to divert promotional spending from FSIs and redirect it towards targeted, in-store methods in order to reach consumers who are most likely to use coupons, as well as those users who are amenable to product trial and brand switching.

As alternative marketing strategies have been sought, numerous new advertising schemes have been introduced (and, in some cases, subsequently vanished) over the past several years. These include (1) Co-op direct mail programs, which can be divided into two categories, i.e., shared and consumer direct; (2) "electronic shelf", featuring four color coupons that are distributed at the shelf via a plastic dispenser in supermarkets and drug/mass merchandiser outlets; (3) "electronic checkout", where coupons are issued at supermarket checkout based upon competitive, complimentary, or like product scanned; (4) "in-pack/on-pack" couponing, where coupons are inserted in or on product packages by CPGs and are usually redeemable on a subsequent purchase of the same product and occasionally a complimentary product; (5) "instant redeemable coupons", which are on-pack coupons that are affixed to product packages and designed such that consumers can remove them at a retailer's shelf for immediate redemption; (6) newspaper R.O.P., which involves coupons printed as part of the redirect paper or flyer itself, and can be executed as a co-op or on a solo basis; (7) magazine couponing, which is normally executed on a solo basis, but may be included as a four-color pop up insert in selected magazines; (8) "interactive coupons", which typically rely upon kiosks for distribution; (9) "XtraValu" coupons, where CPG coupons have been distributed in "saddlebag" pouches that are placed over the neck of one-gallon milk containers; (10) "Egg coupons", where multi-folded coupons are inserted into cartons of eggs—this program eventually failed due to inconsistent retailer coverage, limited reach, and coupon damage caused by cracked eggs; (11) "off-the-shelf" couponing, which utilizes disposable shelf dispensers; (12) "Ad-Strip", where two- and four-color coupons are printed on the gusset strip of supermarket and department store plastic shopping bags; and (13) internet coupons.

Still, FSI's and shared mail continue to dominate because they provide advertisers with a promotion and advertising medium that delivers broad reach at an affordable rate. On the other hand, both of these coupon-delivery methods suffer from at least two major weaknesses: they do not have an in-store presence and they deliver low redemption rates.

The features and advantages of the present invention will become more apparent through the following description. It should be understood, however, that the detailed description and specific examples, while indicating particular embodiments of the invention, are given by way of illustration only and various modifications may naturally be performed without deviating from the spirit of the present invention.

DETAILED DESCRIPTION

Figure 1:
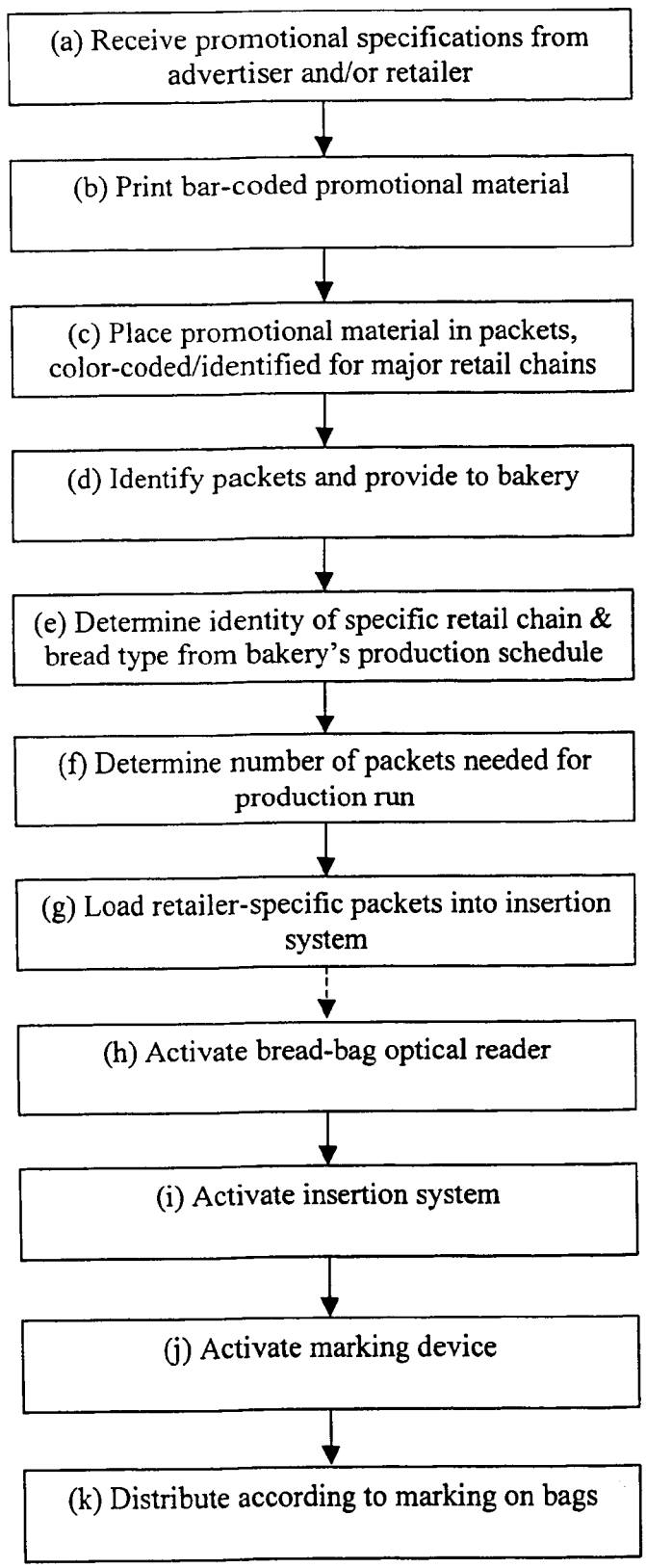
FIG. 1 shows a condensed flow-chart format of non-exhaustive, alternative embodiments of the invented method.

In this application, the term coupons has been used from time to time as an example of, or synonymously with, "promotional material" or "advertising material". However, such use is by way of example, and for ease of reference, only, and not by way of limitation.

An embodiment of the present invention is directed to a method of targeted advertising of particularized goods and/or services, whereby one or more pieces of targeted promotional material are included inside a package of bread at about the time a loaf of bread is placed into the package, and before the package is sealed. The pieces of promotional material generally fall into a plurality of categories, including: (1) retailer-specific coupons (e.g., coupons that are offered by, and are redeemable in, SafeWay stores in the Los Angeles area, for products that generally complement bread); (2) national coupons that are redeemable only at the same specific retailer (e.g., coupons from Tide, Kraft Foods, or Nabisco, which may be redeemed only at SafeWay stores in the Los Angeles area); (3) advisory materials (e.g., health-related material or "tip" sheets, informational material, recipes, advertising material from other businesses or organizations within the Los Angeles area, and other similar information appearing in textual format); (4) product samples; and (5) other promotional items (e.g., refrigerator-door magnets that carry advertisements and may be used to hold up the above-mentioned "tip" sheets).

An embodiment of the present invention is also related to a method of distributing promotional material, in which bread is used as a vehicle to deliver bread packages containing specific promotional materials to specific retail stores. In its various embodiments, the present invention offers several advantages. First, it allows the specific retailer for whom the bread is being made and packaged (e.g., SafeWay, Giant, etc.) to obtain information about which specific national and/or store brands are to be promoted. In a preferred embodiment the coupon is only redeemable at the issuing chain. This, in turn, allows the retailer to estimate the demand for, and maintain an adequate stock of, the items that have been promoted. In addition, the invention encourages repeat traffic into the retailer's store. This is especially true when the coupon is store/chain specific. Moreover, the invention increases coupon security by nearly eliminating instances of fraudulent redemption of the type that is prevalent with newspaper, or similar loose, couponing schemes. For example, it is believed that some small storeowners have clipped coupons and submitted them for redemption even though the coupon was not presented by a customer and no sale actually took place.

The present invention also takes advantage of several qualities that are unique to bread as a vehicle for advertising. First, because bread is shipped by bulk, and not by weight, the inclusion of promotional material inside the bread bag does not increase shipping costs. This is to be contrasted with traditional means of advertising (e.g., through newspapers), where there is a cost associated with the distribution of promotional materials (e.g., cost of postage and/or cost of insertion of coupons in a newspaper).

Second, from a practical standpoint, bread is dry, so that there is no damage to the promotional material from being packaged with the bread. Third, as a commodity, bread is not in competition with most other goods/products. Fourth, in contrast with other goods/products, almost everybody buys bread, with quite regular frequency. Fifth, in contrast with newspapers, mailings, etc., a package of bread usually ends up, and is opened, in the kitchen. This is normally an uncluttered environment which provides for maximum exposure with minimum distraction. Similar to a Sunday newspaper, the present invention permits "mass media" distribution of coupons in a short period of time, and at a relatively low cost.

Finally, the specific type of bread can be used to target certain segments of the consumer population, referred to as "primary demographic groups", which have been determined to be the most likely users of the product being advertised. Thus, for example, coupons for cheese may be included in bags of white bread, which are directed at children. Similarly, coupons for health foods may be included in bags of whole-wheat bread, which would be directed at the health-conscious consumer. These and other buying characteristics (age, sex, income, preference of bread type, etc.) are also within the scope of the invention. Once the target primary demographic group is identified, the relevant set of coupons can be included into packages of bread that are delivered to retailers servicing the target group (e.g., SafeWay stores in areas where there is a high concentration of families with small children).

Figure 2:
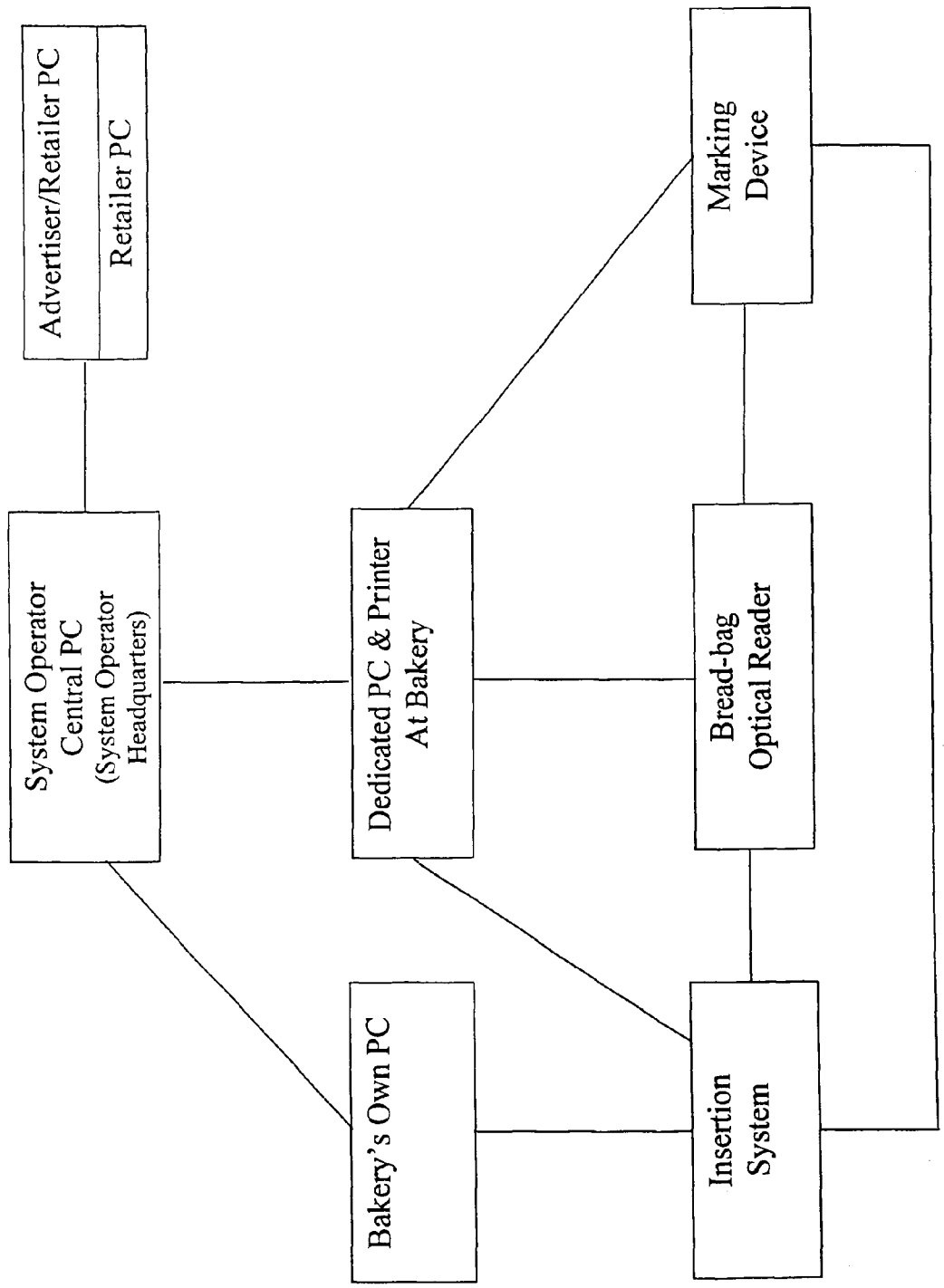
FIG. 2 shows an illustration of communication links established between electronic computers and/or devices that may be used in the practice of an embodiment of the invented method.

As shown in FIGS. 1 and 2, the present invention involves the flow of information among three basic entities: (1) the system operator; (2) one or more advertisers and/or retailers, generally referred to as "clients", and (3) one or more bread-baking and packaging facilities, generally referred to as "bakeries".

The process starts with step (a) in FIG. 1, where system operator receives promotional specifications from its clients. Client specifications generally relate to instructions for printing coupons, tip sheets, and other textual material, and include such information as coupon (i.e., discount) amount, the identity and location of a retailer where a coupon may be redeemed (e.g., Los Angeles SafeWay Stores), the identity of a specific product or service that is advertised (e.g., Kraft sliced cheese, or SafeWay's own brand peanut butter), and other similar information. Client specifications may also include instructions for the inclusion of product samples, or other promotional items, with the printed material.

The client's specifications (e.g., the particular coupons) are received by a central electronic computer (designated generally as "PC") at the system operator's headquarters. In one embodiment, the system operator prints the coupons and inserts them in one or more envelopes, for use in a store-by-store, chain-by-chain, and/or region-by-region basis. In another embodiment, an electronic form of the coupons (or the like) can be transmitted over the system operator's dedicated PC that is maintained onsite in all bakeries with which the system operator transacts business. In addition to the coupons' information concerning the daily production, what coupons are to be inserted, number of coupons per packages, where the bread is going and number of coupons per store or chain, other coupon and destination information is also sent (e.g., via P.C.) to the bakery and, if desired, to the machine performing the actual insertion of the envelopes. In one embodiment, the system operator maintains a full-time employee at the bakery, who organizes the promotional material onsite (either by physically receiving the coupons from the system operator or by downloading the coupons from the on-site computer) and implementing the client's specifications (step (b)).

The specifications also define the number and types of promotional materials that each client would like to have included in each specific package of bread. As an example, SafeWay may direct the system operator to include a coupon offering a $0.20 discount on SafeWay brand peanut butter in every package of white sliced bread that is going to be delivered to Los Angeles-area SafeWay stores on a given day. In addition, Kraft Foods may instruct the system operator to include a $0.35 coupon for Kraft cream cheese in the same package of bread, with the coupon being redeemable only at the specific Los Angeles-area SafeWay stores. A third specification may be provided by a chef/author (who is promoting a book of recipes, e.g.) who instructs the system operator to include in the same package his recipe for making quick and healthy snacks for children. As noted above, these three coupons are inserted into a packet by the system operator. Packets are then grouped and/or marked store-by-store, chain-by-chain, and/or region-by-region. In another embodiment, an onsite employee will then assemble these three pieces of promotional material and place them in packets that are color-coded for particular store or stores or for a particular major retail chain. The packets are then grouped into batches, with each batch bearing a bar code, or other identifying indicia. See FIG. 1, steps (c)–(g), and (i). In effect, the system operator's dedicated PC manages the inventory of promotional material and, as explained further below, provides a daily schedule for the onsite employee.

At the bakery, the employee reviews the bakery's production schedule on a daily basis to determine which retailers are going to be receiving what types of bread and in what quantities on that day. The employee then loads the batches of packets containing the various types of promotional material into magazine canisters of an insertion system. By way of example, at present, the insertion-system canisters can be loaded with up to eight types of packets. These canisters can be used to provide packets for eight distinct production runs, or for a single run containing a very large number of loaves of bread.

As is depicted graphically in FIG. 2, in one embodiment of the invention, the above-described process may be automated. That is, once the system operator's dedicated PC receives the specifications from the system operator's central PC concerning the daily production runs, what is to be inserted and like information, it transmits such information to the appropriate personnel at the bakery and at times, to the machinery performing the insertion of the packets. It can then communicate with the bakery's own PC to receive the day's production schedule. Next, based on the production schedule and the client's specifications, the dedicated PC instructs the insertion system to insert the promotional materials. The dedicated PC, the bakery's PC, and the insertion system then remain in electronic contact throughout each production run to ensure that the proper packets are inserted into each package of bread. In another embodiment, the Bakery's own PC and the dedicated PC can be one and the same. Similar information can also be sent from the system operator's central PC or the dedicated PC back to the advertiser and/or the retailer. This can be especially helpful for the retailer (e.g., the store or chain) as they will then know what coupons are being used. The store/chain can then better plan their stocking and inventory control. The same information can also be used to generate necessary in-store signage.

In one embodiment of the invention, the method may employ an optical bar-code reader, or similar device, as indicated by hashed arrow leading to step (h). In practice, each bread bag that is to be filled bears a bar code, or similar data (or indicia) that identifies the type of bread that is to be loaded (e.g., white bread). The optical reader is placed underneath the table holding the bags to be filled, and can be used to identify each bag just prior to filling of the bread. In terms of where a particular loaf of bread is to be sent, a symbol (e.g., a sticker) is placed on the bag. Alternatively, the bag can be premarked either with a bar bode or with the store's name printed on the bag, or by using a particular color-code bag.

Given that most bread-packaging units run at the speed of about 50 bags per minute, from a practical standpoint, it is sometimes difficult to achieve precision in every production run. More specifically, if the bakery's PC indicates that, for example, 500 bags of white bread are going to be loaded, it may turn out that 503 bags are, in fact, filled. This would mean that 3 bags might have improperly received packets that were not intended for those bags. Given this scenario, the optical reader, in electronic communication with the dedicated PC and the insertion system, helps ensure that the $501^{st}$ bag, which bears a different bar code or bears a different label or sticker than the $500^{th}$ bag, receives its own specialized packet, rather than a packet left over from the previous run.

As indicated by the hashed arrow pointing to step (j), in an embodiment of the invention, the method can include a marking device. In this embodiment, once a package of bread has been filled and the proper packet inserted, the marking device marks the outside of each package with a label, flag, tag, or other similar attachment, that is color-coded for the major chains, and informs consumers of the contents of the packets inside (e.g., value of coupons to be found inside the bag). In this way, the marking device is used in the distribution of the bags and, thus, the promotional materials (Step (k)).

As before, the marking device can work in electronic connection and cooperation with the dedicated PC and the insertion system. It is also noted that the optical reader, the insertion system, and/or the marking device may be used in conjunction with the dedicated PC to provide a tracking system which accounts for the number and types of promotional-material packets that have been inserted into bread bags on a given day, as well as the retail destination to which they have been sent.

It will be apparent to a person of ordinary skill in the art that embodiments of the present invention are not limited to specific embodiments disclosed herein. Thus, the present invention is intended to encompass all of the embodiments disclosed and suggested herein as defined by the claims appended hereto and any equivalents thereof.

What is claimed is:

1. A method for distributing promotional material placed inside a package of bread from a bread-making facility in which bread is baked, sliced, and packaged, said method comprising the steps of:
   a. providing promotional specifications by one or more clients;
   b. generating promotional materials based on said specifications; and
   c. placing a packet, which contains one or more pieces of the promotional materials, inside each said package at the bread-making facility based on one or more factors selected from the group consisting of the specific type of bread to be packaged and a retail destination of said package of bread,
   wherein a computer at the bread-making facility controls the insertion of said packet in said package of bread and wherein predetermined packets of promotional materials are placed in packages for predetermined retail destinations.

2. The method of claim 1, wherein said client is selected from the group consisting of an advertising entity and a retailer.

3. The method of claim 1, wherein said specifications include information selected from the group consisting of a coupon amount, the identity and location of a retailer where a coupon may be redeemed, the identity of a specific product or service that is advertised, and information to be provided in said package in textual format.

4. The method of claim 1, wherein the promotional material is selected from the group consisting of coupons, advertisements, samples, food recipes, publications, informational sheets, related promotional items, and combinations thereof.

5. A method for distributing promotional material placed inside a package of bread from a bread-making facility in which bread is baked, sliced, and packaged, said method comprising the steps of:
   a. providing promotional specifications by one or more clients;
   b. generating promotional materials based on said specifications;
   c. placing a packet, which contains one or more pieces of the promotional materials, inside each said package at the bread-making facility based on a retail destination of said package of bread; and d. electronically transmitting the retail destination to a computer at the bread-making facility, wherein the computer in step (d) controls the insertion of the packet in the package of bread and wherein predetermined packets of promotional materials are placed in packages for predetermined retail destinations.

6. The method of claim 5, wherein at least one of the pieces of promotional materials can only be redeemed at predetermined stores.

7. The method of claim 5, further including step (e) which comprises marking each package of bread with a store-specific symbol.

8. The method of claim 5, wherein the computer in step (d) electronically transmits information for the retail destination to an insertion system, said computer instructing said system to insert specific promotional material for a predetermined retailer inside each package of bread.

9. The method of claim 8, further comprising the step of providing electronic instructions to a marking device to provide an attachment on the outside of each package of bread containing a packet, wherein said attachment is color-coded to provide the identity and location of said retailer.

10. The method of claim 9, wherein said attachment further identifies the contents of the packet enclosed inside each said package.

11. The method of claim 9, further including means for tracking the type, quantity, and retail destination of the packets of promotional materials.

12. A method for distributing promotional material placed inside a package of bread from a bread-making facility in which bread is baked, sliced, and packaged, said method comprising the steps of:

a. generating a series of packets of promotional materials for multiple retail destinations on a store-by-store, chain-by-chain, or region-by-region basis;

b. providing said series of packets to a bread-making facility;

c. inserting a packet into each package of bread at the bread-making facility based upon the retail destination of the particular package of bread; and d. marking each package of bread with means for identifying the retail destination, wherein a computer at the bread-making facility controls the insertion of said packet in said package of bread and wherein predetermined packets of promotional materials are placed in packages for predetermined retail destinations.

13. The method of claim 12 wherein the selection of the particular retail destination in step (c) is electronically transmitted to the computer at the bread-making facility.

14. A method of distributing targeted promotional material to segments of the consumer population identified as primary demographic groups by including said material inside a package of bread, said method comprising the steps of:

a. providing multiple categories of promotional materials, wherein the categories include retailer-specific coupons, national coupons that are redeemable only at said retailer, and advisory materials selected from the group consisting of informational material, health-related material, recipes, and advertising material relating to entities that are located in substantially the same geographic area as said retailer;

b. generating a packet that contains one or more pieces of promotional material from each of a plurality of said categories so as to be targeted at a specific primary demographic group serviced by said retailer; and c. including said packet in each package of bread that is destined for said retailer, wherein a computer at the bread-making facility controls the insertion of said packet in said package of bread and wherein predetermined packets of promotional materials are placed in packages for predetermined retail destinations.

15. A method of distributing targeted promotional material to segments of the consumer population identified as primary demographic groups by including said material inside a package of bread, said method comprising the steps of:

a. providing multiple categories of promotional materials, wherein the categories include retailer-specific coupons, national coupons that are redeemable only at said retailer, and advisory materials selected from the group consisting of informational material, health-related material, recipes, and advertising material relating to entities that are located in substantially the same geographic area as said retailer;

b. generating a packet that contains a combination of one or more pieces of promotional material from each of a plurality of said categories so as to be targeted at a specific primary demographic group serviced by said retailer, wherein the combination is determined as a function of one or more factors selected from the group consisting of the identity of the specific retailer, the location of the specific retailer, the type of bread to be packaged, and the buying characteristics of the target primary demographic group; and c. including said packet in each package of bread that is destined for said retailer, wherein a computer at the bread-making facility controls the insertion of said packet in said package of bread and wherein predetermined packets of promotional materials are placed in packages for predetermined retail destinations.

16. A method for distributing promotional material placed inside a package of bread from a bread-making facility in which bread is baked, sliced, and packaged, said method comprising the steps of:

a. providing promotional specifications by one or more clients, wherein said specifications are electronically transmitted to a central computer;

b. generating promotional materials based on said specifications; and c. placing a packet, which contains one or more pieces of the promotional materials, inside each said package at the bread-making facility based on one or more factors selected from the group consisting of the specific type of bread to be packaged and a retail destination of said package of bread, wherein a computer at the bread-making facility controls the insertion of said packet in said package of bread and wherein predetermined packets of promotional materials are placed in packages for predetermined retail destinations.

17. The method of claim 16, wherein step (b) is performed by means selected from the group consisting of:

a. generating said promotional materials by output means connected to said central computer; and b. electronically transmitting said specifications from said central computer to said computer at the bread-making facility and generating said promotional materials by output means connected to said computer at the bread-making facility.

18. A method of distributing targeted promotional material to segments of the consumer population identified as primary demographic groups by including said material inside a package of bread, said method comprising the steps of:

a. providing multiple categories of promotional materials, wherein the categories include retailer-specific coupons, national coupons that are redeemable only at said retailer, and advisory materials selected from the group consisting of informational material, health-related material, recipes, and advertising material relating to entities that are located in substantially the same geographic area as said retailer;

b. obtaining identifying information about the retailer by electronic transmission;

c. based on the retailer's identity, generating a packet that contains one or more pieces of promotional material targeted at a specific primary demographic group serviced by said retailer; and d. including said packet in each package of bread that is destined for said retailer, wherein a computer at the bread-making facility controls the insertion of said packet in said package of bread and wherein predetermined packets of promotional materials are placed in packages for predetermined retail destinations.

* * * * *